United States Patent
Huang et al.

(10) Patent No.: US 9,572,098 B2
(45) Date of Patent: Feb. 14, 2017

(54) NETWORK ACCESS METHOD AND DEVICE

(71) Applicant: HUAWEI TECHNOLOGIES CO., LTD., Shenzhen, Guangdong (CN)

(72) Inventors: Kaidi Huang, Shenzhen (CN); Jiasong Ning, Chengdu (CN); Xingxin Zhang, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 102 days.

(21) Appl. No.: 14/584,360

(22) Filed: Dec. 29, 2014

(65) Prior Publication Data

US 2015/0124705 A1 May 7, 2015

Related U.S. Application Data

(63) Continuation of application No. PCT/CN2013/076363, filed on May 29, 2013.

(30) Foreign Application Priority Data

Jul. 2, 2012 (CN) .......................... 2012 1 0225200

(51) Int. Cl.
*H04W 48/20* (2009.01)
*H04W 4/00* (2009.01)

(52) U.S. Cl.
CPC ................................. *H04W 48/20* (2013.01)

(58) Field of Classification Search
None
See application file for complete search history.

(56) References Cited

U.S. PATENT DOCUMENTS

| 7,263,377 B1 | 8/2007 | Wahlstrom et al. | |
| 2011/0205910 A1* | 8/2011 | Soomro | H04W 80/04 370/252 |
| 2013/0083653 A1* | 4/2013 | Jain | H04W 4/005 370/230 |

(Continued)

FOREIGN PATENT DOCUMENTS

| CN | 101193157 A | 6/2008 |
| CN | 101415223 | 4/2009 |
| CN | 101867979 | 10/2010 |

OTHER PUBLICATIONS

PCT Forms PCT/ISA/210 (International Search Report), PCT/ISA/220, and PCT/ISA/237 mailed Sep. 5, 2013 for corresponding International Patent Application No. PCT/CN2013/076363.

(Continued)

*Primary Examiner* — Eunsook Choi
(74) *Attorney, Agent, or Firm* — Staas & Halsey LLP (57) ABSTRACT

When an access point notifies a user equipment of a communications network supported by the access point, the access point also notifies the user equipment of priority information of the access point, so that the user equipment can select an access point that an operator expects the UE to select, to be connected to the communications network, thereby avoiding inconsistency between an access point, which is randomly selected by the user equipment to be connected to a communications network, and an access point that a communications network operator expects the UE to select.

17 Claims, 5 Drawing Sheets

(56) References Cited

U.S. PATENT DOCUMENTS

2014/0101726 A1* 4/2014 Gupta ................ H04N 21/2365
726/4

OTHER PUBLICATIONS

International Search Report mailed Sep. 5, 2013 in corresponding international application PCT/CN2013/076363.
Chinese Office Action dated Jan. 18, 2016 in corresponding Chinese Patent Application No. 201210225200.8.

* cited by examiner

NETWORK ACCESS METHOD AND DEVICE

CROSS-REFERENCE TO RELATED APPLICATIONS

This application is a continuation of International Application No. PCT/CN2013/076363, filed on May 29, 2013, which claims priority to Chinese Patent Application No. 201210225200.8, filed on Jul. 2, 2012, all of which are hereby incorporated by reference in their entireties.

TECHNICAL FIELD

Embodiments of the present invention relate to wireless communications networks, and in particular, to a network access method and a device.

BACKGROUND

The 3rd Generation Partnership Project (The 3rd Generation Partnership Project, "3GPP" for short) is a leading 3G technical specification organization with the purpose of studying, formulating, and promoting 3G standards that is based on an evolved GSM core network.

Figure 1:
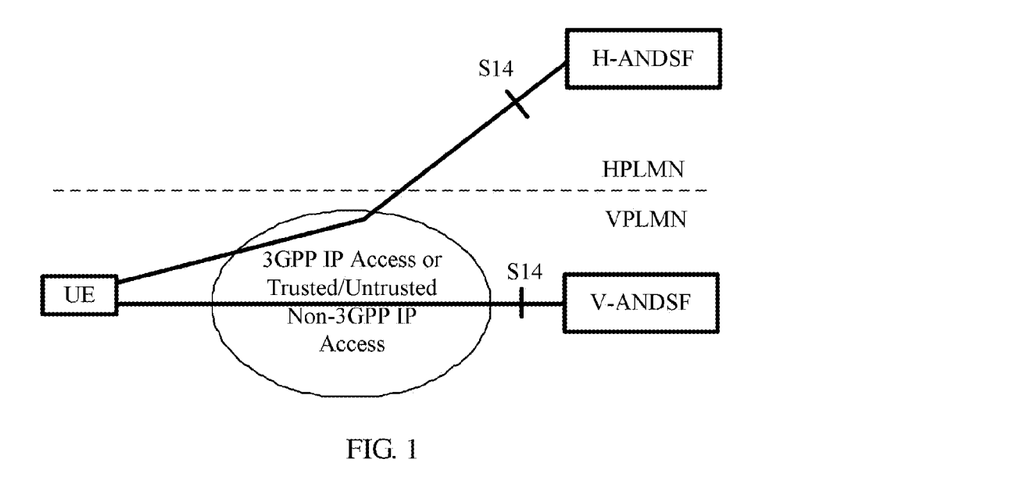
FIG. 1 is a structural diagram of a deployment of an ANDSF in the prior art.

An access network discovery and selection function (Access Network Discovery and Selection Function, "ANDSF" for short) is a functional entity formulated by 3GPP in an evolved packet core network (Evolved Packet Core, "EPC" for short), and the ANDSF is used to assist a user terminal (User Equipment, "UE" for short) in discovering and choosing to be connected to a non-3GPP network such as Wi-Fi or WiMAX. A structural diagram of a deployment of the ANDSF is shown in FIG. 1: A UE exchanges information with an ANDSF server through an S14 interface by using IP layer communication. When the UE is in a home public land mobile network (Home Public Land Mobile Network, "HPLMN" for short), the UE only needs to acquire an operator policy from a home ANDSF ("H-ANDSF" for short). When the UE is in a visited public land mobile network (Visited Public Land Mobile Network, "VPLMN" for short), the UE may establish a connection to the H-ANDSF or a visited ANDSF server ("V-ANDSF" for short) or both, to acquire an operator policy. Acquiring an operator policy by a UE includes the following three steps: discovery of an ANDSF server, establishment of an ANDSF security link, and acquiring of an operator policy.

There are three main manners for the discovery of an ANDSF server (that is, acquiring of an IP address of the ANDSF server): 1. Home operator configuration, which may be used for an H-ANDSF; 2. Dynamic Host Configuration Protocol (Dynamic Host Configuration Protocol, "DHCP" for short) query, which may be used for an H-ANDSF; 3. Domain name system (Domain Name System, "DNS" for short) query, which may be used for both an H-ANDSF and a V-ANDSF.

The establishment of an ANDSF security link is mainly as follows: The UE and the ANDSF server perform two-way authentication (GBA-based) of a pre-shared key (Pre-Shared Key, "PSK" for short) and a Transport Layer Security protocol (Transport Layer Security, "TLS" for short), to establish a security link connection between the UE and the ANDSF. If the UE does not support the security mechanism, a security mechanism stipulated in Open Mobile Alliance-Device Management (Open Mobile Alliance-Device Management, "OMA-DM" for short) needs to be used to ensure link security.

The acquiring of an operator policy mainly includes two modes: a Pull mode and a Push mode. The Pull mode means that the user terminal actively initiates a query to the ANDSF server, to acquire a related operator policy; the Push mode means that the ANDSF server sends prompt information (such as SMS) to the user terminal, the user terminal establishes a connection to an ANDSF according to the prompt information and initiates an information query, and the UE initiates an information query request to the ANDSF by using Generic Alert information of OMA DM. The UE and the ANDSF use an ANDSF management object (Management Object, "MO" for short, which is an OMA-DM MO) to carry operator policy information, so as to exchange information.

An ANDSF mainly provides the following three kinds of information for a UE: 1. An inter-system mobility policy (Inter-system mobility policy, "ISMP" for short), where the policy mainly provides a network selection policy for a user terminal that cannot simultaneously support multimode transmission (such as LTE and Wi-Fi); 2. An inter-system routing policy (Inter-system routing policy, "ISRP" for short), where the policy mainly provides a network selection policy for a user terminal that can simultaneously support multimode transmission (such as LTE and Wi-Fi); 3. Network discovery information (Discovery Information), where the information provides a list of available networks, which is based on a user terminal location, for the user terminal, and the list includes access information of each network, so as to assist the user terminal in being connected to the network. Each ISMP and ISRP have a corresponding valid restriction, which includes a user terminal location (including a physical location, a cell location, or the like) and time. A user terminal selects an operator policy with a highest priority from all valid operator policies (when priorities of all valid operator policies are the same, a visited operator policy is prior to a home operator policy; if all valid operator policies belong to a same priority and a same operator, a decision is made based on implementation).

Figure 2:
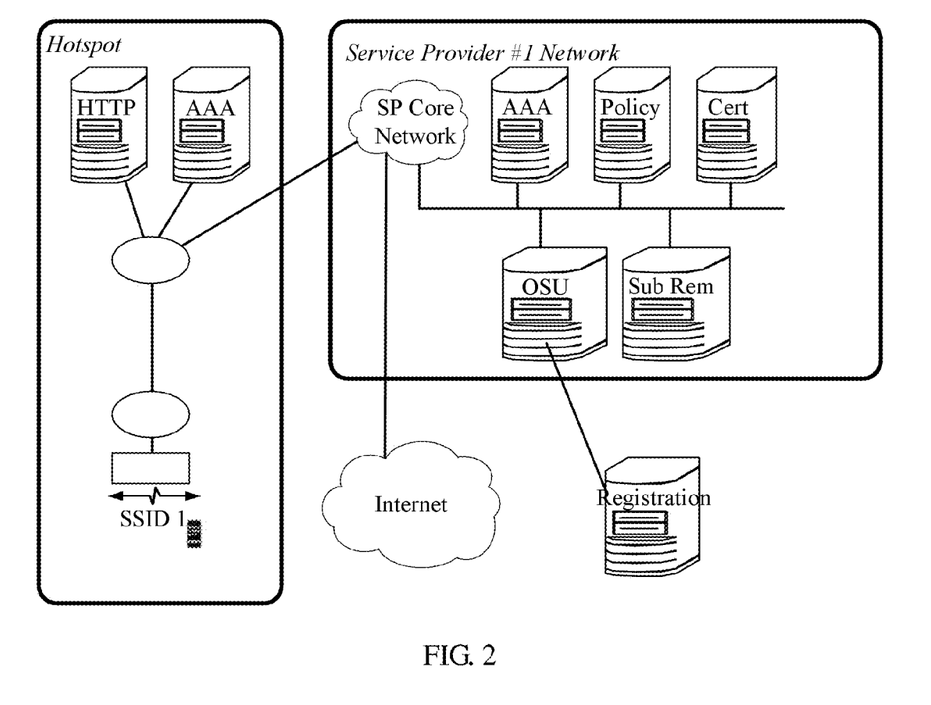
FIG. 2 is a structural diagram of a deployment of a Subscription MO in the prior art.

Wi-Fi Alliance (Wi-Fi Alliance) was founded in 1999, aiming at improving interoperability between wireless network products that are based on the IEEE 802.11 specifications. A Subscription MO mechanism is a management mechanism proposed by the alliance for managing Wi-Fi users' account information and an operator policy (a network access policy). A deployment structure of the Subscription MO is shown in FIG. 2: A UE is connected to a service operator network by using a Wi-Fi access network (a Hotspot network), exchanges account information on an OSU server, and exchanges operator policy information on a policy server. Before a user exchanges with these servers, a mutual authentication message needs to be forwarded by an Authentication, Authorization and Accounting (Authentication Authorization Accounting, "AAA" for short) server of the Hotspot network to an AAA server of the service operator, so as to perform two-way authentication, and then the UE can exchange information with the OSU server or the policy server by using a Hypertext Transfer Protocol over Secure Socket Layer (Hypertext Transfer Protocol over Secure Socket Layer, "HTTPs" for short) technology. The UE and the OSU server or the policy server use a Subscription MO to carry user account information and operator policy information, so as to exchange information. The operator policy mainly includes a list of visited service providers (with priorities) that are recommended by an operator for access and a list of visited service operators that are prohibited by the operator.

The following scenario may occur in the prior art: A UE roams to a remote area and enters an operation scope of an operator, but the UE is not a subscriber of the operator. For some reason (for example, expensive 3GPP tariff), the UE is not connected to a 3GPP network of the operator (therefore, the UE cannot establish a connection to an ANDSF server of the operator to acquire a policy of the operator), but the UE determines to be connected to a network of the operator by using Wi-Fi, and finds, by means of scanning, that the operator leases multiple Wi-Fi access points provided by multiple Wi-Fi service providers. In this case, the UE randomly selects an access point of the multiple Wi-Fi access points because the UE does not know a network access policy of the operator. As a result, the selection may be inconsistent with the network access policy of the operator (that is, the access point selected by the UE is not an access point that the operator expects the UE to select). The UE acquires the network access policy of the operator after the UE visits the network of the operator by using the access point. In this case, if the access point selected by the UE is not the access point that the operator expects the UE to select, the UE exits the access point that is selected previously, and reselects an access point according to the acquired policy.

The foregoing network access process is low in efficiency.

SUMMARY

Embodiments of the present invention provide a network access method.

The embodiments of the present invention may be specifically implemented by using the following technical solutions:

According to one aspect, a network access method is provided, and the method includes:

sending, by an access point, a network access message to a user equipment, where the network access message includes priority information of the access point and a communications network supported by the access point, where the priority information is used by the user equipment to select an access point to be connected to the communications network.

An access point is further provided, and the station includes:

a transmitting module, where the transmitting module is configured to send a network access message to a user equipment, the network access message includes priority information of the access point and a communications network supported by the access point, and the priority information is used by the user equipment to select an access point to be connected to the communications network.

According to another aspect, a network access method is further provided, and the method includes:

receiving, by a user equipment, a network access message sent by an access point, where the network access message includes priority information of the access point and a communications network supported by the access point; and selecting, by the user equipment according to the priority information, an access point to be connected to the communications network.

A user equipment is further provided, and the user equipment includes:

a receiving module and an access module, where the receiving module is configured to receive a network access message sent by an access point, and the network access message includes priority information of the access point and a communications network supported by the access point; and the access module is configured to select, according to the priority information, an access point to be connected to the communications network.

In the present invention, when an access point notifies a user equipment of a communications network supported by the access point, the access point also notifies the user equipment of priority information of the access point, so that the user equipment can select an access point that an operator expects the UE to select, to be connected to the communications network, thereby avoiding inconsistency between an access point, which is randomly selected by the user equipment to be connected to a communications network, and an access point that a communications network operator expects the UE to select.

DESCRIPTION OF EMBODIMENTS

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

It should be understood that, the technical solutions of the embodiments of the present invention may be applied to various communications systems, such as: a Global System for Mobile Communications (Global System of Mobile communication, "GSM" for short) system, a Code Division Multiple Access (Code Division Multiple Access, "CDMA" for short) system, a Wideband Code Division Multiple Access (Wideband Code Division Multiple Access, "WCDMA" for short) system, a general packet radio service (General Packet Radio Service, "GPRS" for short), a Long Term Evolution (Long Term Evolution, "LTE" for short) system, an LTE frequency division duplex (Frequency Division Duplex, "FDD" for short) system, an LTE time division duplex (Time Division Duplex, "TDD" for short), a Universal Mobile Telecommunications System (Universal Mobile Telecommunication System, "UMTS" for short), a Worldwide Interoperability for Microwave Access (Worldwide Interoperability for Microwave Access, "WiMAX" for short) communications system, a microwave communication system.

Embodiment 1

Figure 3:
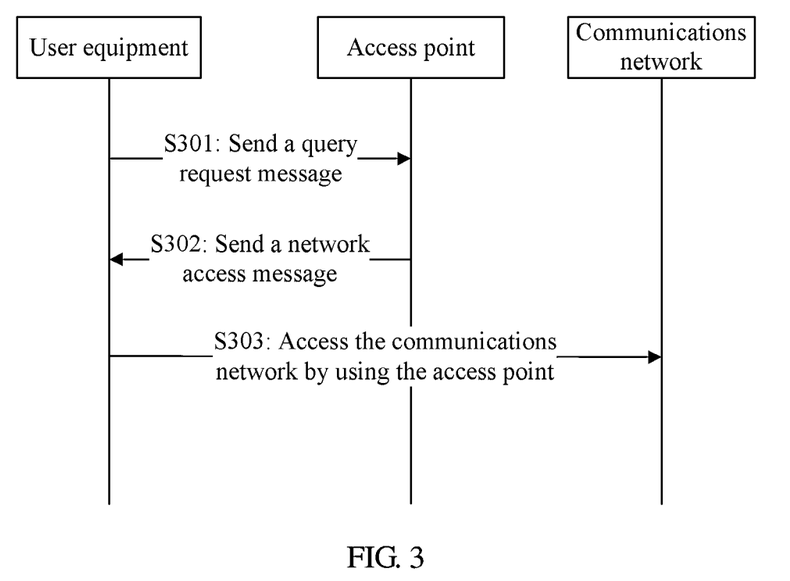
FIG. 3 is a flowchart of a network access method according to an embodiment of the present invention.

FIG. 3 is a schematic flowchart of a network access method according to an embodiment of the present invention. As shown in FIG. 3 the method includes:

S300: A user equipment sends a query request message to an access point.

When the user equipment visits another communications network by using a Wi-Fi network, the user equipment may first send the query request message to the access point, to query a communications network that can be visited by using the access point.

S301: The access point sends a network access message to the user equipment.

The access point may actively broadcast the network access message to the user equipment, and may also send the network access message to the user equipment in a manner of responding to the query request message in S300. When the access point actively broadcasts the network access message to the user equipment, S300 may be omitted.

The network access message may be a Roaming Consortium Information Element whose structure is listed in Table 1:

TABLE 1

| Element ID | Length | Number of ANQP OIs | OI #1 and #2 lengths | OI #1 Duple | OI #2 Duple | OI #3 Duple |
|---|---|---|---|---|---|---|

Element ID is an ID number of the network access message, Length is filled as a length of the network access message, and Number Of ANQP OI is a quantity of OI Duples included in the network access message, where the quantity of OI Duples is 3 in this embodiment, and OI Duple is extended to a structure listed in Table 2:

TABLE 2

| OI | Priority |
|---|---|

OI is a number of a communications network supported by the access point, and OI can uniquely identify a corresponding communications network. Priority is priority information of the access point, where the priority information refers to a priority, of the access point or a Wi-Fi access service provider to which the access point belongs, in the communications network supported by the access point. A communications network operator may formulate the priority information for the access point or the Wi-Fi access service provider to which the access point belongs. In this embodiment, Priority occupies 1 byte.

The network access message may also include a Roaming Consortium List and the priority information, where a structure of the Roaming Consortium List is listed in Table 3, and a structure of the priority information is listed in Table 4:

TABLE 3

|  | Info ID | Length | OI Duple #1 (optional) | OI Duple #2 (optional) | ... | OI Duple #N (optional) |
|---|---|---|---|---|---|---|
| Octets: | 2 | 2 | variable | variable |  | variable |

TABLE 4

| Element ID | Length | Number of Priorities | Priority #1 | Priority #1 | ... | Priority #N |
|---|---|---|---|---|---|---|

In Table 3, Info ID is an ID number of the network access message, Length is a length of the network access message, OI Duple is a number of the communications network supported by the access point, and OI Duple can uniquely identify a corresponding communications network.

In Table 4, Element ID is an ID number of the priority information. A sequence from Priority #1 to Priority #N is consistent with and in a one-to-one correspondence to a sequence of OI Duple in the Roaming Consortium List.

The network access message may further be another Roaming Consortium List whose structure is listed in Table 5:

TABLE 5

|  | Info ID | Length | OI Duple #1 (optional) | OI Duple #2 (optional) | ... | OI Duple #N (optional) |
|---|---|---|---|---|---|---|
| Octets: | 2 | 2 | variable | variable |  | variable |

Info ID is an ID number of the network access message, Length is a length of the network access message, and OI Duple is extended to a structure listed in Table 6:

TABLE 6

| OI Length | OI | Priority |
|---|---|---|

OI Length is a length of OI, OI is a number of the communications network supported by the access point, and OI can uniquely identify a corresponding communications network. Priority is priority information of the access point, where the priority information refers to a priority, of the access point or a Wi-Fi access service provider to which the access point belongs, in the communications network supported by the access point. A communications network operator may formulate the priority information for the access point or the Wi-Fi access service provider to which the access point belongs. In this embodiment, Priority occupies 1 byte.

The network access message may further be a NAI Realm List whose structure is listed in Table 7:

TABLE 7

|  | Info ID | Length | NAI Realm Count | NAI Realm Data #1 (optional) | NAI Realm Data #2 (optional) | ... | NAI Realm Data #N (optional |
|---|---|---|---|---|---|---|---|
| Octets: | 2 | 2 | 2 | variable | variable |  | variable |

Info ID is an ID number of the network access message, Length is a length of the network access message, NAI Realm Count is a quantity of NAI Realm Data included in the network access message; and NAI Realm Data is network access identification (Network Access Identification, "NAI" for short) data of the communications network supported by the access point. The NAI data includes information such as a network access identifier of a communications network and an identification manner used by the communications network. A structure of the NAI Realm Data is listed in Table 8:

TABLE 8

| NAI Realm Data Field Length | NAI Realm Encoding | Priority | NAI Realm Length | NAI Realm | EAP Method Count | EAP Method #1 | ... | EAP Method #N |
|---|---|---|---|---|---|---|---|---|

Priority is extracted from original NAI Realm Encoding, where the original NAI Realm Encoding has 8 bits, and 7 bits is extracted for Priority to indicate priority information of the access point. The priority information refers to a priority, of the access point or a Wi-Fi access service provider to which the access point belongs, in the communications network supported by the access point. A communications network operator may formulate the priority information for the access point or the Wi-Fi access service provider to which the access point belongs. New NAI Realm Encoding occupies 1 bit.

S302: The user equipment selects, according to priority information, an access point to be connected to a communications network.

In this embodiment, when a quantity of access points is 1, the user equipment may directly select the access point to be connected to the communications network; when the quantity of access points is greater than 2, the user equipment selects, according to the priority information, an access point with a highest priority to be connected to the communications network. It should be noted that all access points in this embodiment of the present invention support a same communications network.

In this embodiment, when an access point notifies a user equipment of a communications network supported by the access point, the access point also notifies the user equipment of priority information of the access point, so that the user equipment can select an access point with a highest priority to be connected to the communications network, thereby avoiding inconsistency between an access point, which is randomly selected by the user equipment to be connected to a communications network, and an access point that a communications network operator expects the UE to select.

Embodiment 2

FIG. 3 is a schematic flowchart of a network access method according to an embodiment of the present invention. As shown in FIG. 3, steps in Embodiment 2 are substantially the same as steps in Embodiment 1; compared with Embodiment 1, there is a difference for Embodiment 2: A network access message sent by an access point to a user equipment further includes correspondence information between a level of a user equipment and a priority of an access point.

A communications network operator may formulate different network access policies for user equipments of different levels. Therefore, when a user equipment selects, according to priority information, an access point to be connected to a communications network, the user equipment may select, according to the correspondence information between the level of a user equipment and the priority of an access point, an access point with a corresponding priority to be connected to the communications network. It should be noted that in this embodiment, the level of a user equipment may be a level, of the equipment, in a communications network, and may also be an account number level, of the equipment, in the communications network; and both may be set by an operator.

For example, when user equipments are divided into two levels: VIP and average, and when a communications network operator specifies, during formulating of a network access policy, that a VIP user equipment corresponds to an access point whose priority is 1 and an average user equipment corresponds to an access point whose priority is 2, an access point notifies, by using the network access message, the user equipment of a communications network supported by the access point, priority information of the access point, and the correspondence information between the level of a user equipment and the priority of an access point. The correspondence information may be a priority list, as listed in Table 9:

TABLE 9

| Level of User equipment | Priority of Access point |
|---|---|
| VIP user | 1 |
| Average user | 2 |

If a priority of an access point A is 1 and a priority of an access point B is 2, correspondingly, when the user equipment selects, according to priority information, an access point to be connected to a communications network, the VIP user equipment selects, according to the correspondence information, the access point A to be connected to the network, and the average user equipment selects, according to the correspondence information, the access point B to be connected to the network.

In this embodiment, a network access message sent by an access point to a user equipment further includes correspondence information between levels of user equipments and different priorities, thereby achieving that different network access policies are provided for user equipments of different levels.

Embodiment 3

FIG. 3 is a schematic flowchart of a network access method according to an embodiment of the present invention. As shown in FIG. 3, steps in Embodiment 3 are substantially the same as steps in Embodiment 2, and a difference between Embodiment 3 and Embodiment 2 is as follows: In Embodiment 2, an access point sends correspondence information between all levels of user equipments and all priorities of access points to a user equipment; in Embodiment 3, a query request message sent by a user equipment to an access point further includes equipment information of the user equipment, where the equipment information includes but is not limited to a level of the user equipment, a subscription communications network, and an identity of the user equipment. Correspondingly, the access point determines the level of the user equipment according to the equipment information of the user equipment and sends priority information to the user equipment, where the priority information is priority information that is of an access point corresponding to the user equipment and is determined by the access point according to the equipment information of the user equipment that is included in the query request message.

In this embodiment, a network access message sent by an access point to a user equipment further includes priority information corresponding to equipment information of the user equipment, thereby achieving that different network access policies are provided for user equipments of different identities.

Embodiment 4

Figure 4:
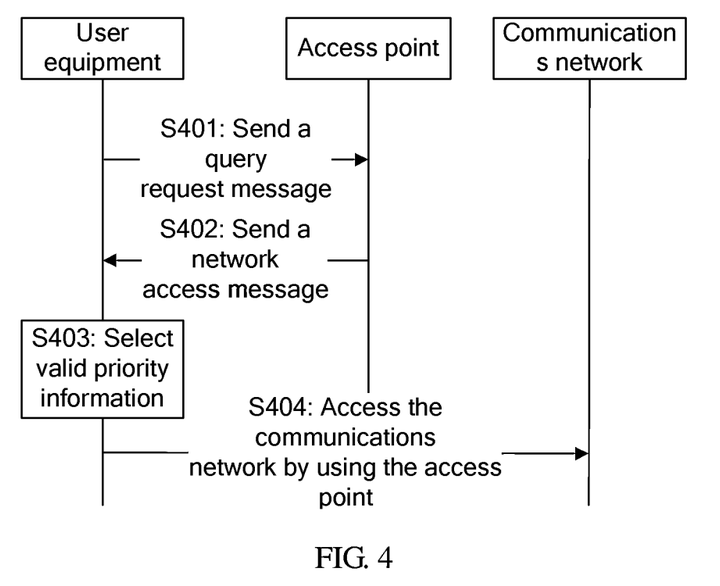
FIG. 4 is a flowchart of a network access method according to an embodiment of the present invention.

FIG. 4 is a schematic flowchart of a network access method according to an embodiment of the present invention. As shown in FIG. 4, steps in Embodiment 4 are substantially the same as steps in Embodiment 1, and a difference between Embodiment 4 and Embodiment 1 is as follows: A network access message sent by an access point to a user equipment further includes time when the priority information is formulated and/or a version number of the priority information.

Because priority information may be preset in the user equipment, after the user equipment receives priority information sent by the access point, if the priority information that is preset is consistent with the priority information sent by the access point, an access point is selected, according to any priority information, to be connected to a communications network; and if the priority information that is preset is inconsistent with the priority information sent by the access point, valid priority information is selected according to the time when the priority information is formulated and/or the version number of the priority information, and an access point is selected, according to the valid priority information, to be connected to the communications network. For example, if time when the user equipment presets or updates priority information is later than time when the user equipment receives all priority information, the priority information preset by the user equipment is valid, and the user equipment selects, according to the priority information preset by the user equipment, an access point to be connected to a communications network; or if a version number of the priority information preset by the user equipment is earlier than version numbers of all priority information received by the user equipment, the priority information received by the user equipment is valid, and the user equipment selects, according to the priority information received by the user equipment, an access point to be connected to the communications network.

In this embodiment, a network access message sent by an access point to a user equipment further includes time when the priority information is formulated and/or a version number of the priority information, so that the user equipment can select valid priority information.

Embodiment 5

Figure 5:
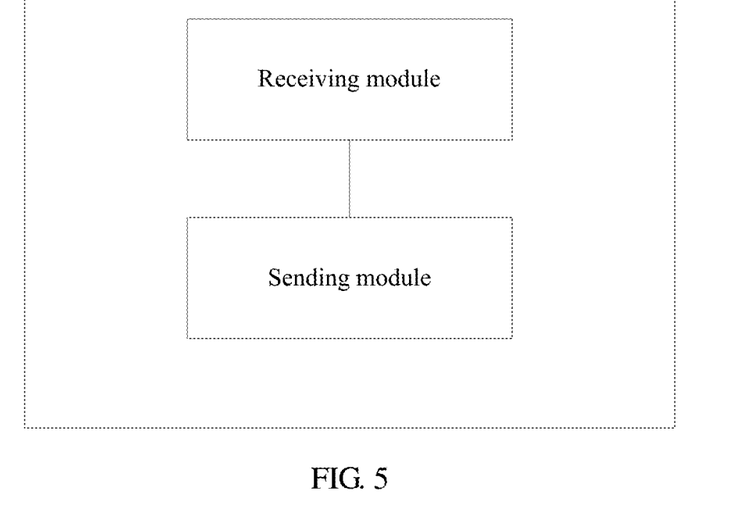
FIG. 5 is a structural diagram of an access point according to an embodiment of the present invention.

FIG. 5 is a schematic structural diagram of an access point according to an embodiment of the present invention. As shown in FIG. 5, the access point includes:

a receiving module, configured to receive a query request message sent by a user equipment; and a transmitting module, configured to send a network access message to the user equipment, where the network access message includes priority information of the access point and a communications network supported by the access point, so that the user equipment selects, according to the priority information, an access point to be connected to the communications network.

The access point may actively broadcast the network access message to the user equipment, and may also send the network access message to the user equipment in a manner of responding to the query request message received by the receiving module. When the access point actively broadcasts the network access message to the user equipment, the access point may not include the foregoing receiving module.

The network access message may further include correspondence information between a level of a user equipment and a priority of an access point; correspondingly, the user equipment selects, according to the level of the user equipment itself and the correspondence information, an access point with a corresponding priority to be connected to the communications network.

The network access message may further include a version number of the priority information and/or time when the priority information is formulated, so that the user equipment selects valid priority information; correspondingly, the user equipment selects, according to the valid priority information, an access point to be connected to the communications network.

Embodiment 6

Figure 6:
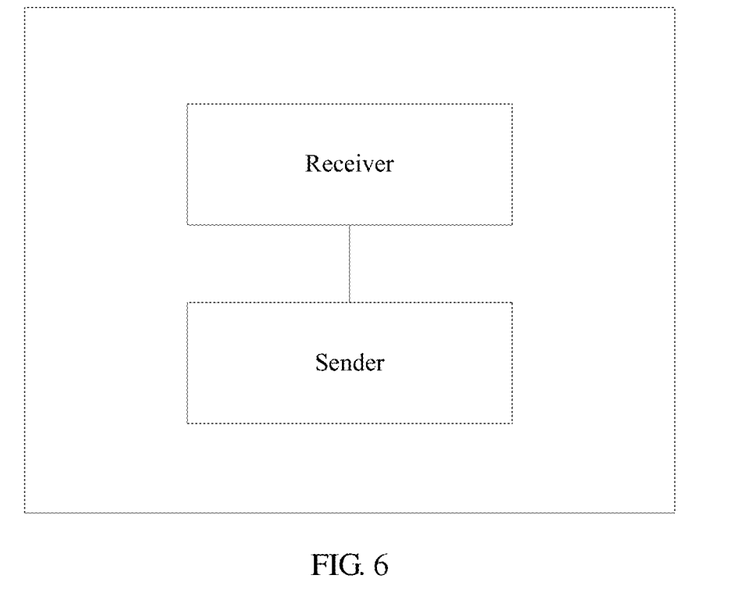
FIG. 6 is a structural diagram of an access point according to an embodiment of the present invention.

FIG. 6 is a schematic structural diagram of an access point according to an embodiment of the present invention. As shown in FIG. 6, the access point includes:

a receiver, configured to receive a query request message sent by a user equipment; and a transmitter, configured to send a network access message to the user equipment, where the network access message includes priority information of the access point and a communications network supported by the access point, so that the user equipment selects, according to the priority information, an access point to be connected to the communications network.

The access point may actively broadcast the network access message to the user equipment, and may also send the network access message to the user equipment in a manner of responding to the query request message received by the receiver. When the access point actively broadcasts the network access message to the user equipment, the access point may not include the foregoing receiver.

The network access message may further include correspondence information between a level of a user equipment and a priority of an access point; correspondingly, the user equipment selects, according to the level of the user equipment itself and the correspondence information, an access point with a corresponding priority to be connected to the communications network.

The network access message may further include a version number of the priority information and/or time when the priority information is formulated, so that the user equipment selects valid priority information; correspondingly, the user equipment selects, according to the valid priority information, an access point to be connected to the communications network.

Embodiment 7

Figure 7:
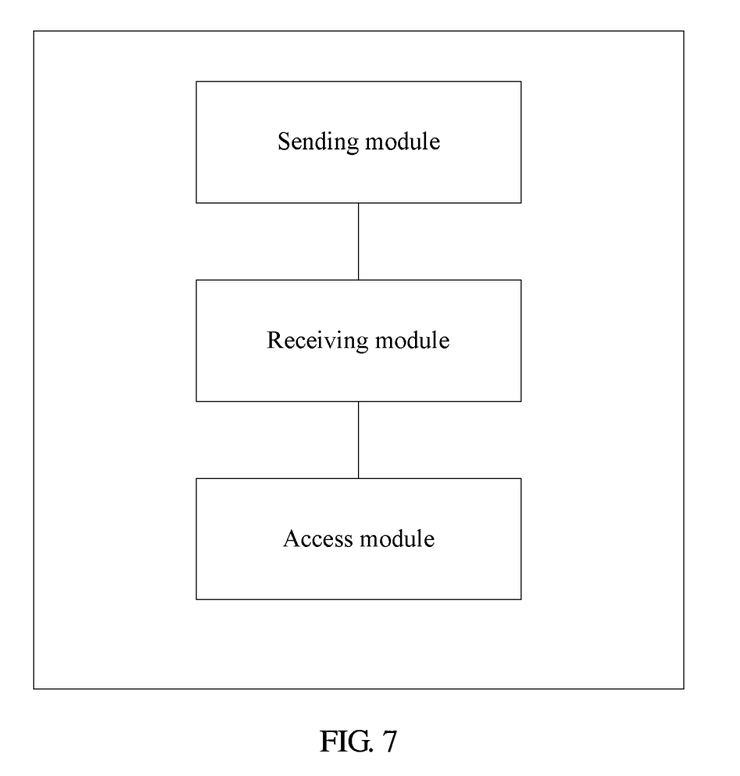
FIG. 7 is a structural diagram of a user equipment according to an embodiment of the present invention.

FIG. 7 is a schematic structural diagram of a user equipment according to an embodiment of the present invention. As shown in FIG. 7, the user equipment includes:

a sending module, configured to send a query request message to an access point;

a receiving module, configured to receive a network access message sent by the access point, where the network access message includes priority information of the access point and a communications network supported by the access point; and an access module, configured to select, according to the priority information, an access point to be connected to the communications network.

When the access point actively broadcasts the network access message to the user equipment, the foregoing user equipment may not include the foregoing sending module.

The access module is specifically configured to select an access point with a highest priority to be connected to the communications network.

The query request message may include equipment information of the user equipment, where the equipment information includes but is not limited to a level of the user equipment, a subscription communications network, and an identity of the user equipment; the priority information is priority information that is of an access point corresponding to the user equipment and is determined by the access point according to the equipment information of the user equipment that is included in the query request message.

Embodiment 8

Figure 8:
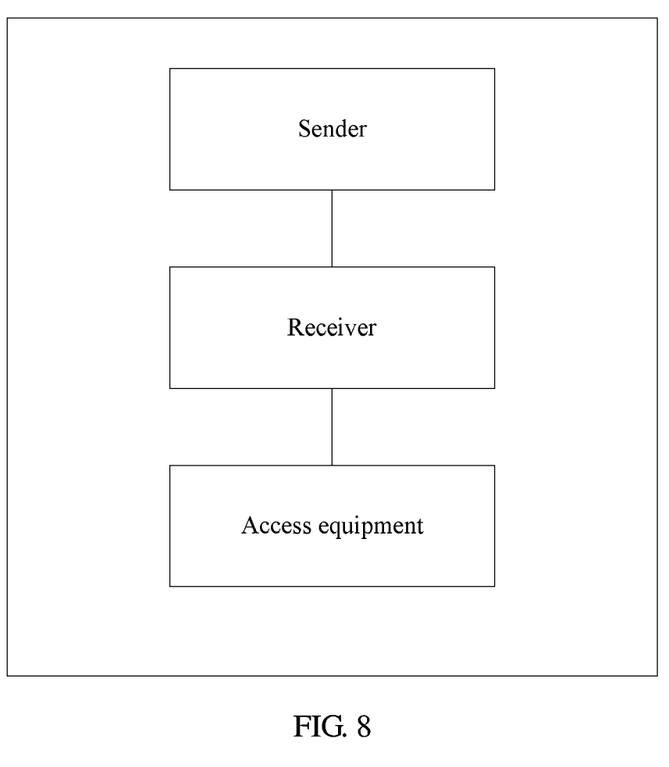
FIG. 8 is a structural diagram of a user equipment according to an embodiment of the present invention.

FIG. 8 is a schematic structural diagram of a user equipment according to an embodiment of the present invention. As shown in FIG. 8, the user equipment includes:

a sender, configured to send a query request message to an access point;

a receiver, configured to receive a network access message sent by the access point, where the network access message includes priority information of the access point and a communications network supported by the access point; and an access equipment, configured to select, according to the priority information, an access point to be connected to the communications network.

When the access point actively broadcasts the network access message to the user equipment, the foregoing user equipment may not include the foregoing sender.

The access equipment is specifically configured to select an access point with a highest priority to be connected to the communications network.

The query request message may include equipment information of the user equipment, where the equipment information includes but is not limited to a level of the user equipment, a subscription communications network, and an identity of the user equipment; the priority information is priority information that is of an access point corresponding to the user equipment and is determined by the access point according to the equipment information of the user equipment that is included in the query request message.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments of the present invention.

In addition, functional units in the embodiments of the present invention may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The software product is stored in a storage medium and includes several instructions for instructing a computer device (which may be a personal computer, a server, or a network device) to perform all or a part of the steps of the methods described in the embodiments of the present invention. The foregoing storage medium includes:

any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific embodiments of the present invention, but are not intended to limit the protection scope of the present invention. Any modification or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A network access method, comprising:
   sending, by an access point, a network access message to a user equipment, wherein the network access message comprises priority information of the access point and a communications network supported by the access point, wherein
   the priority information is used by the user equipment to select an access point to be connected to the communications network;
   wherein the network access message further comprises a version number of the priority information and/or time when the priority information is formulated; the version number of the priority information and/or the time when the priority information is formulated is used by the user equipment to select valid priority information;
   the selecting, by the user equipment, an access point to be connected to the communications network comprising: selecting, by the user equipment according to the valid priority information, an access point to be connected to the communications network.

2. The method according to claim 1, before the method, further comprising the following step:
   receiving, by the access point, a query request message sent by the user equipment, wherein the query request message is used to query the communications network supported by the access point.

3. The method according to claim 1, wherein the network access message further comprises correspondence information between a level of a user equipment and a priority of an access point;
   the selecting, by the user equipment, an access point to be connected to the communications network is: selecting, by the user equipment according to the correspondence information between the level of a user equipment and the priority of an access point, an access point with a corresponding priority to be connected to the communications network.

4. The method according to claim 2, wherein the query request message comprises equipment information of the user equipment, wherein the equipment information comprises a subscription communications network of the user equipment, a level of the user equipment, or an identity of the user equipment.

5. The method according to claim 4, wherein the priority information of the access point is priority information that is of an access point corresponding to the user equipment and is determined by the access point according to the equipment information of the user equipment that is comprised in the query request message.

6. A network access method, comprising:
   receiving, by a user equipment, a network access message sent by an access point, wherein the network access message comprises priority information of the access point and a communications network supported by the access point; and
   selecting, by the user equipment according to the priority information, an access point to be connected to the communications network;
   wherein the network access message further comprises a version number of the priority information and/or time when the priority information is formulated;
   before the selecting, by the user equipment according to the priority information, an access point to be connected to the communications network, the method further comprises: selecting, by the user equipment according to the time when the priority information is formulated and/or the version number of the priority information, valid priority information; and
   the selecting, by the user equipment according to the priority information, an access point to be connected to the communications network comprising: selecting, by the user equipment according to the valid priority information, an access point to be connected to the communications network.

7. The method according to claim 6, wherein the selecting, by the user equipment according to the priority information, an access point to be connected to the communications network is: selecting, by the user equipment, an access point with a highest priority to be connected to the communications network.

8. The method according to claim 7, before the receiving, by a user equipment, a network access message sent by an access point, further comprising the following step:
   sending, by the user equipment, a query request message to the access point, wherein the query request message is used to query the communications network supported by the access point.

9. The method according to claim 6, wherein the network access message further comprises correspondence information between a level of a user equipment and a priority of an access point;
   the selecting, by the user equipment according to the priority information, an access point to be connected to the communications network is: selecting, by the user equipment according to the correspondence information between the level of a user equipment and the priority of an access point, an access point with a corresponding priority to be connected to the communications network.

10. The method according to claim 8, wherein the query request message comprises equipment information of the user equipment, and the equipment information comprises but is not limited to a subscription communications network of the user equipment, a level of the user equipment, or an identity of the user equipment.

11. The method according to claim 10, wherein the priority information of the access point is priority information that is of an access point corresponding to the user equipment and is determined by the access point according to the equipment information of the user equipment that is comprised in the query request message.

12. An access point, comprising:
    a non-transitory memory configured to store an instruction; and
    a processor coupled to the memory and configured to execute the instruction to: send a network access message to a user equipment, the network access message comprises priority information of the access point and a communications network supported by the access point, and the priority information is used by the user equipment to select an access point to be connected to the communications network;

wherein the network access message further comprises a version number of the priority information and/or time when the priority information is formulated;

the version number of the priority information and/or the time when the priority information is formulated is used by the user equipment to select valid priority information; and the selecting, by the user equipment according to the priority information, an access point to be connected to the communications network comprising: selecting, by the user equipment according to the valid priority information, an access point to be connected to the communications network.

13. The access point according to claim 12, wherein the processor is configured to receive a query request message sent by the user equipment, and the query request message is used to query the communications network supported by the access point.

14. The access point according to claim 12, wherein the network access message further comprises correspondence information between a level of a user equipment and a priority of an access point;

the selecting, by the user equipment according to the priority information, an access point to be connected to the communications network is: selecting, by the user equipment according to the correspondence information between the level of a user equipment and the priority of an access point, an access point with a corresponding priority to be connected to the communications network.

15. A user equipment, comprising:

a non-transitory memory configured to store an instruction; and a processor coupled to the memory and configured to executed the instruction to: receive a network access message sent by an access point, and the network access message comprises priority information of the access point and a communications network supported by the access point;

and select, according to the priority information, an access point to be connected to the communications network;

wherein the network access message further comprises a version number of the priority information and/or time when the priority information is formulated; the version number of the priority information and/or the time when the priority information is formulated is used by the user equipment to select valid priority information;

the selecting, by the user equipment, an access point to be connected to the communications network comprising: selecting, by the user equipment according to the valid priority information, an access point to be connected to the communications network.

16. The user equipment according to claim 15, wherein the processor is configured to send a query request message to the access point, and the query request message is used to query the communications network supported by the access point.

17. The user equipment according to claim 15, wherein the selecting, by the user equipment according to the priority information, an access point to be connected to the communications network is: selecting, by the user equipment, an access point with a highest priority to be connected to the communications network.

* * * * *

UNITED STATES PATENT AND TRADEMARK OFFICE
CERTIFICATE OF CORRECTION

| | | |
|---|---|---|
| PATENT NO. | : 9,572,098 B2 | Page 1 of 1 |
| APPLICATION NO. | : 14/584360 | |
| DATED | : February 14, 2017 | |
| INVENTOR(S) | : Kaidi Huang et al. | |

It is certified that error appears in the above-identified patent and that said Letters Patent is hereby corrected as shown below:

In the Claims

Column 16, Line 5, Claim 15:
Delete "executed" and insert -- execute --, therefor.

Signed and Sealed this
Sixteenth Day of May, 2017

Michelle K. Lee
*Director of the United States Patent and Trademark Office*